(12) United States Patent
Wang et al.

(10) Patent No.: US 10,943,132 B2
(45) Date of Patent: Mar. 9, 2021

(54) DISTANT ON-ROAD OBJECT DETECTION

(71) Applicant: Black Sesame International Holding Limited, Santa Clara, CA (US)

(72) Inventors: Zuoguan Wang, Los Gatos, CA (US); Qun Gu, San Jose, CA (US); Jizhang Shan, Los Gatos, CA (US)

(73) Assignee: Black Sesame International Holding Limited, Santa Clara, CA (US)

( * ) Notice: Subject to any disclaimer, the term of this patent is extended or adjusted under 35 U.S.C. 154(b) by 128 days.

(21) Appl. No.: 16/380,823

(22) Filed: Apr. 10, 2019

(65) Prior Publication Data

US 2020/0327339 A1 Oct. 15, 2020

(51) Int. Cl.
*G06K 9/00* (2006.01)
(52) U.S. Cl.
CPC ..... *G06K 9/00805* (2013.01); *G06K 9/00798* (2013.01)

(58) Field of Classification Search
None
See application file for complete search history.

(56) References Cited

U.S. PATENT DOCUMENTS

2020/0175326 A1* 6/2020 Shen ............... G05D 1/0253

* cited by examiner

*Primary Examiner* — Leon Flores
(74) *Attorney, Agent, or Firm* — Timothy T. Wang; Ni, Wang & Massand, PLLC

(57) ABSTRACT

A method of distant on-road object detection, comprising, capturing an initial frame of a roadway lane in a direction of travel, detecting lane edges in the initial frame, capturing a subsequent frame of the roadway lane, cropping the subsequent frame based on the detected lane edges of the initial frame resulting in an image patch, detecting an image patch object within the image patch, down-sampling the subsequent frame, detecting a down-sampled object within the down-sampled subsequent frame and merging the detections within the image patch and the detections within the down-sampled subsequent frame.

11 Claims, 6 Drawing Sheets

DISTANT ON-ROAD OBJECT DETECTION

BACKGROUND

Technical Field

The instant disclosure is related to advanced driver assistance systems (ADAS) and specifically detecting distant objects.

Background

Advanced driver assistant system (ADAS) is one of the fastest growing techniques in the automotive industry. ADAS provides functions such as automatic emergency braking and lane assist, which are believed to be able to reduce traffic accidents. ADAS functions are built on the accurate perception of the surrounding environment. In many cases detecting near view objects are sufficient for many ADAS functions, detecting distant objects is crucial for other functions. One example is Automatic Emergency Braking (AEB), which provides the function of automatically braking when an emergency occurs. When a car is running at the speed of 100 Km/h, to give the braking system sufficient time to react, the detection system needs to capture objects within the distance of 150 m in the direction of travel of the vehicle. Objects appear small at the distance of 150 m, and this poses challenges for detection and reaction.

A method is sought to efficiently detect distant on-road objects.

SUMMARY

An example of distant on-road object detection, comprising at least one of, capturing an initial frame of a roadway lane in a direction of travel, detecting lane edges in the initial frame, capturing a subsequent frame of the roadway lane, cropping the subsequent frame based on the detected lane edges of the initial frame resulting in an image patch, detecting an image patch object within the image patch, down-sampling the subsequent frame, detecting a down-sampled object within the down-sampled subsequent frame and merging the detections within the image patch and the detections within the down-sampled subsequent frame.

An example system of distant on-road object detection, comprising, a forward looking camera that captures an initial frame of a roadway lane in a direction of travel and captures a subsequent frame of the roadway lane, an image analysis unit that performs at least one of detects lane edges in the initial frame, crops the subsequent frame based on the detected lane edges of the initial frame resulting in an image patch, detects an image patch object within the image patch, down-samples the subsequent frame, detects a down-sampled object within the down-sampled subsequent frame and merges the detections within the image patch and the detections within the down-sampled subsequent frame.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
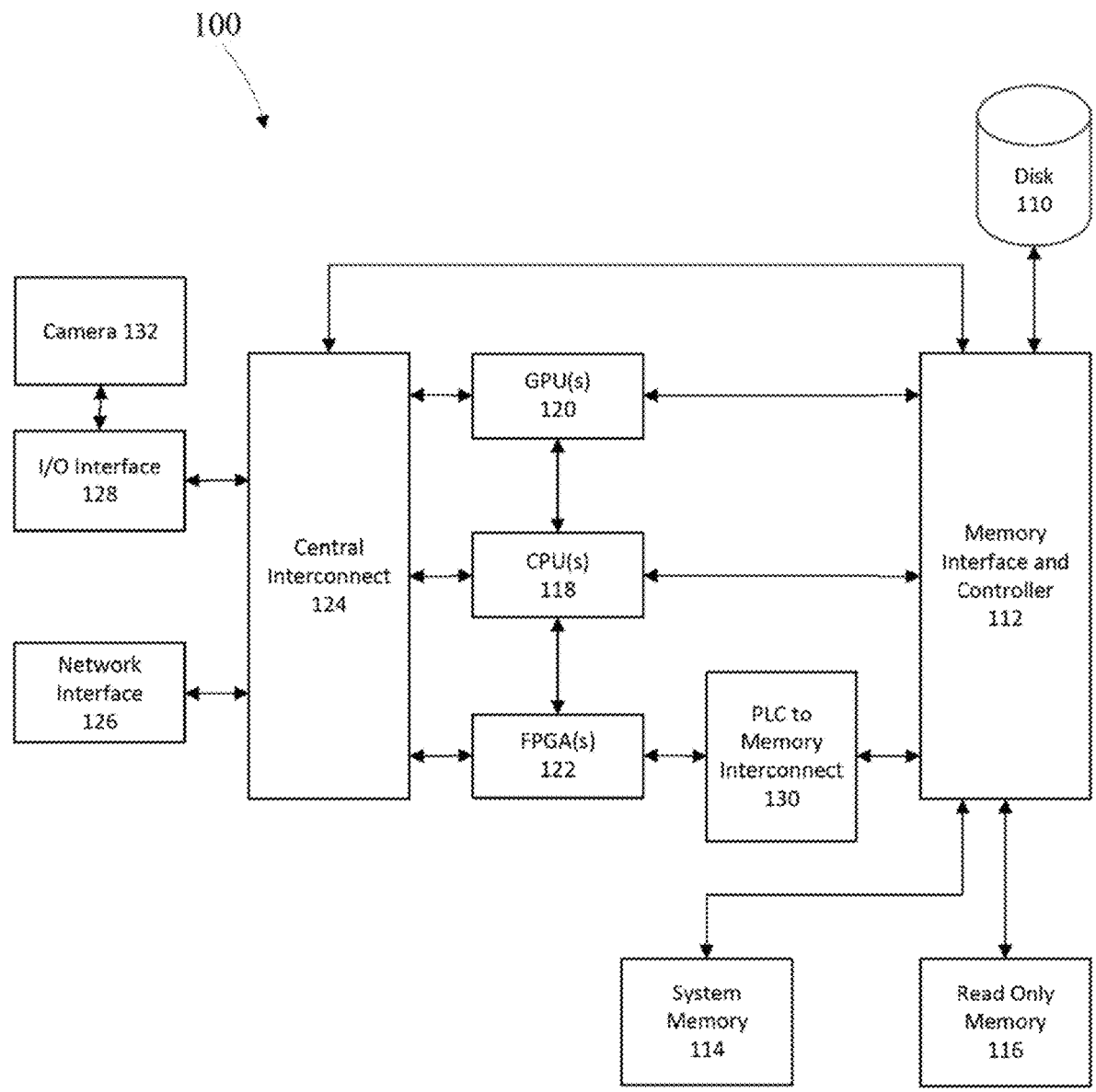
FIG. 1 is a first example system diagram in accordance with one embodiment of the disclosure.

FIG. 1 depicts an example hybrid computational system 100 that may be used to implement neural nets associated with the operation of one or more portions or steps of processes 500 and 600. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
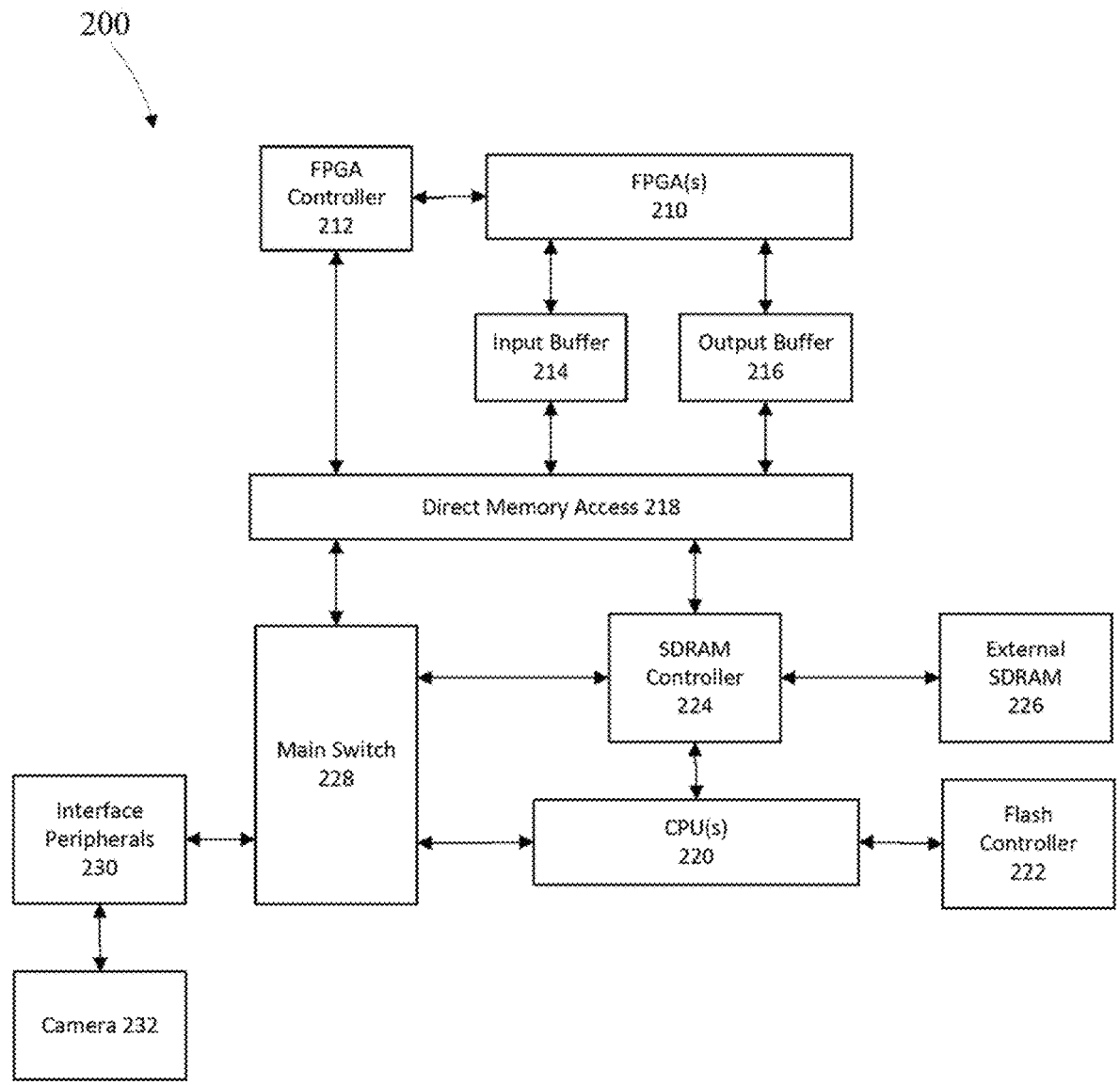
FIG. 2 is a first example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to a camera 132 and the network interface 126.

FIG. 2 depicts a second example hybrid computational system 200 that may be used to implement neural nets associated with the operation of one or more portions or steps of process 500. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to a camera 232. A flash controller 222 controls persistent memory and is connected to the CPU 220.

While there are many sensors available, cameras are a primary tool of most ADAS and autonomous driving systems for its rich information and affordability. In this disclosure images from cameras are a primary area of focus. With a camera of 60 degree field of view (FOV) and 1080p resolution, a car at the distance of 150 m is about 10 pixels by 10 pixels on the image. This is approximately the minimum dimension a detector can capture. Thus, it is better to run a detector on images with 1080p or higher resolutions. To meet the AEB delay requirement, the detector needs to run at the speed of at least 30 fps. If a network detector is used, the computational requirement is beyond the ability of many hardware platforms.

Figure 3:
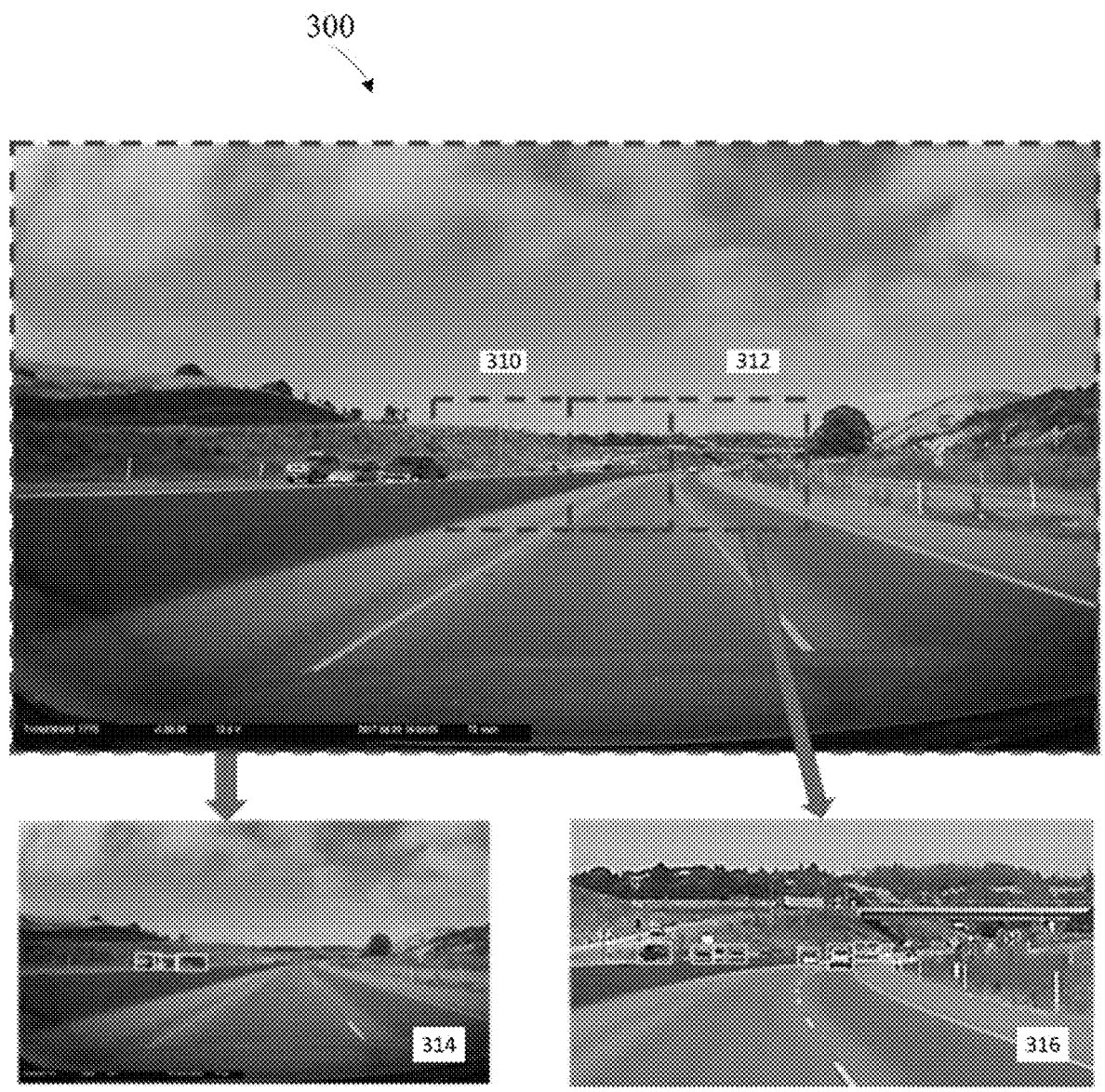
FIG. 3 is an example captured frame in accordance with one embodiment of the disclosure.

One possible solution to address this problem is that instead running detectors at their original resolution, small image patches which potentially contain targeted objects may be utilized. One problem then becomes how to choose the patches. The choice may significantly affect the performance, since objects left outside the patches will have no chance of being found by the detector. The common choices of the patches are the area at the image center. However, this is problematic for ADAS applications because of road curvature. An example is shown in FIG. 3, where box 310 is at the image center, but it misses the cars headed in the same direction, which is unacceptable for an AEB application.

In this disclosure, a method for patch-based object detection is proposed, in which an image patch cropping algorithm is proposed to maximally retain distant on-road objects. The proposed solution is that rather than cropping the image center, the image is cropped to provide a patch around the lane edges, as demonstrated in FIG. 3. The curves are the detected lanes. The box 310 locates the image center and box 312 locates the lane tips, i.e. lane left edge and the lane right edge. The box 312 around the lane edges allows accurate location of distant vehicles. When the lanes are straight, the patch cropped around lane edges is largely overlapped with the one at the image center. However, the in curved lanes utilizing the lane edges makes a big difference for the two cropping methods, as the center vs. lane edge (tips) boxes shown in FIG. 3. The center image box 310 of the image center misses key objects around the curve.

Figure 4:
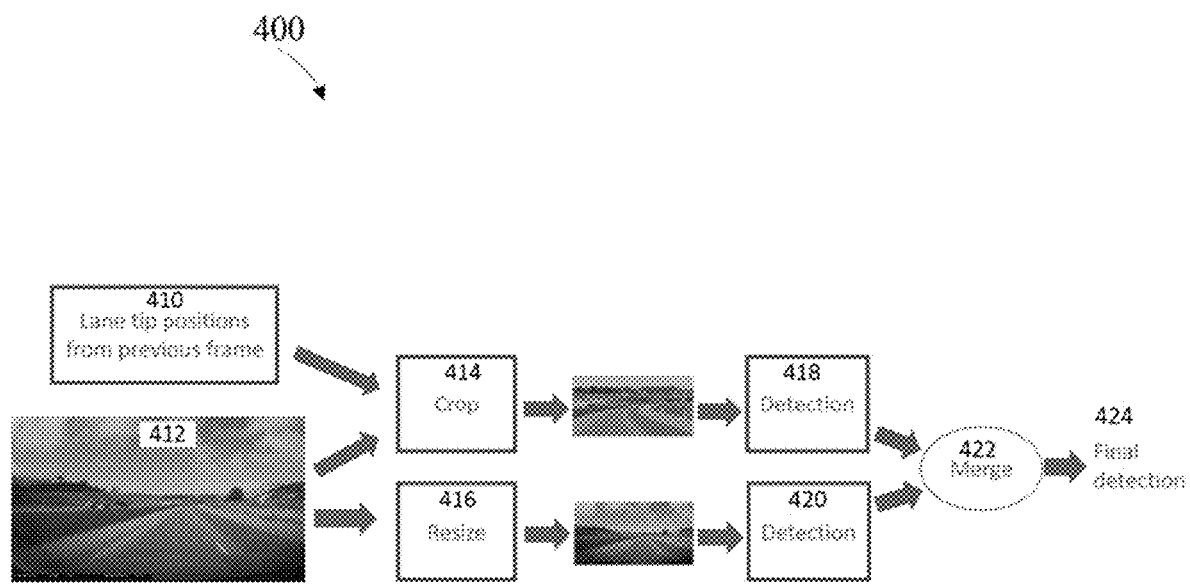
FIG. 4 is a first example method of distant on-road object detection in accordance with one embodiment of the disclosure.

The detection pipeline is depicted in FIG. 4. Rather than using the detected lanes in the current frame, which requires a second pass of the image, the detected lanes from the previous frame 410 are utilized to locate the image patch 412. The assumption is that with 30 fps frame rate, the lane edges should not drift dramatically across frames. The top path in FIG. 4 is responsible for detecting small objects with the help of cropped patch 414. The bottom path resizes 416 and down-samples the original image, based on which the medium and large objects could be detected, while the distant small objects are almost invisible. And the final detection 424 is the merge 422 of results from the two branches 418 and 420.

The lane edges from the initial frame provide a hint as to where to crop the subsequent image patch. The cropped subsequent image patch and the down-sampled initial image are individually passed through an object detector to identify objects of interest. Then the detected objects from the cropped subsequent image patch and down-sampled initial image are merged.

The initial frame is used for detection on the subsequent image. The subsequent image is cropped based on the lane edge position from the initial image, this cropping leaves and image patch. Object detection is performed on the image patch. The subsequent image is down-sampled and another object detection is performed on the down-sampled image. The object detections from the image patch and the down-sampled image are merged as the final detection results.

The proposed framework may significantly reduce computations, while retaining a relatively high accuracy due to the patch cropping method. If the original resolution is 1080×1920, the cropping patch is 192×384 and the down sampled image is 384×768, with the same detection network, the total computation reduction would be approximately 82%.

Figure 5:
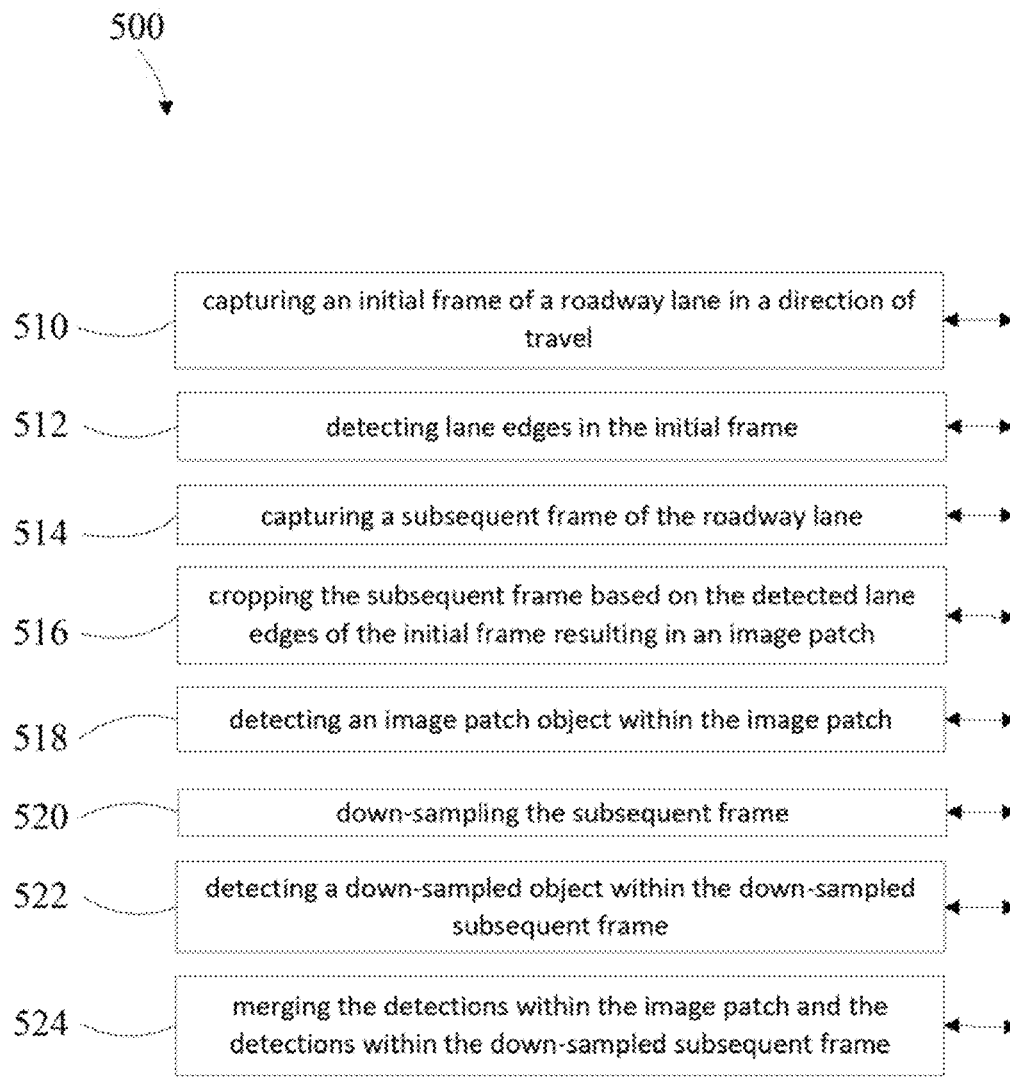
FIG. 5 is a second example method of distant on-road object detection in accordance with one embodiment of the disclosure.

FIG. 5 depicts an example method of distant on-road object detection, comprising, capturing 510 an initial frame of a roadway lane in a direction of travel, detecting 512 lane edges in the initial frame and capturing 514 a subsequent frame of the roadway lane. The method also includes cropping 516 the subsequent frame based on the detected lane edges of the initial frame resulting in an image patch, detecting 518 an image patch object within the image patch, down-sampling 520 the subsequent frame, detecting 522 a down-sampled object within the down-sampled subsequent frame and merging 524 the detections within the image patch and the detections within the down-sampled subsequent frame.

Figure 6:
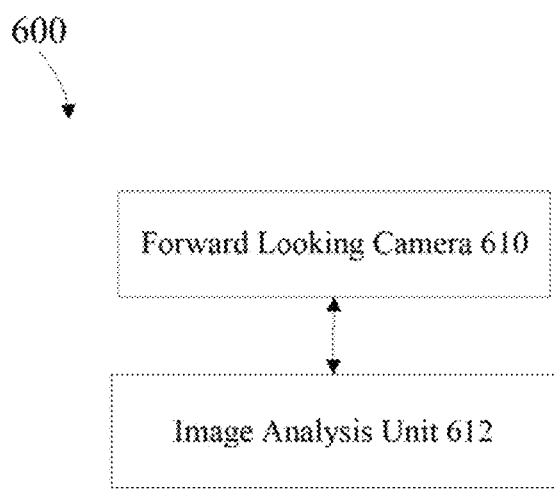
FIG. 6 is a second example system diagram in accordance with one embodiment of the disclosure.

FIG. 6 depicts an example system of distant on-road object detection, comprising, a forward looking camera 610 that captures an initial frame of a roadway lane in a direction of travel and captures a subsequent frame of the roadway lane. The system also includes an image analysis unit 612 that, detects lane edges in the initial frame, crops the subsequent frame based on the detected lane edges of the initial frame resulting in an image patch, detects an image patch object within the image patch, down-samples the subsequent frame, detects a down-sampled object within the down-sampled subsequent frame and merges the detections within the image patch and the detections within the down-sampled subsequent frame.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of distant on-road object detection, comprising:
    capturing an initial frame of a curved roadway lane in a direction of travel;
    detecting lane edges in the initial frame of the curved roadway;
    capturing a subsequent frame of the curved roadway lane;
    cropping the subsequent frame of the curved roadway based on the detected lane edges of the initial frame of the curved roadway resulting in an image patch;

detecting an image patch object within the image patch;
down-sampling the subsequent frame;
detecting a down-sampled object within the down-sampled subsequent frame; and
merging the detection of the image patch object within the image patch and the detection of the down-sampled object within the down-sampled subsequent frame.

2. The method of distant on-road object detection of claim 1 further comprising finally detecting an object of interest based on the merged detections within the image patch and the down-sampled subsequent frame.

3. The method of distant on-road object detection of claim 1 further comprising resizing the subsequent frame.

4. The method of distant on-road object detection of claim 1 wherein the initial frame is captured at a frame rate of least a 30 fps.

5. The method of distant on-road object detection of claim 1 wherein the initial frame is captured at a resolution of at least 1080p.

6. The method of distant on-road object detection of claim 1 wherein images beyond the image patch are discarded from detection.

7. A system of distant on-road object detection, comprising:
a forward looking camera that; and
captures an initial frame of a curved roadway lane in a direction of travel, and
captures a subsequent frame of the curved roadway lane,
an image analysis unit that;
detects lane edges in the initial frame of the curved roadway;
crops the subsequent frame of the curved roadway based on the detected lane edges of the initial frame of the curved roadway resulting in an image patch;
detects an image patch object within die image patch;
down-samples the subsequent frame;
detects a down-sampled object within the down-sampled subsequent frame; and
merges the detection of the merge patch object within the image patch and the detection of the down-sampled object within the down-sampled subsequent frame.

8. The system of distant on-road object detection of claim 7 wherein the image analysis unit further finally detects an object of interest based on the merged detections within the image patch and the down-sampled subsequent frame.

9. The system of distant on-road object detection of claim 8 wherein the forward looking camera captures the frame at a frame rate of at least 30 fps.

10. The system of distant on-road object detection of claim 9 wherein the forward looking camera captures the frame at a resolution of at least 1080p.

11. The system of distant on-road object detection of claim 10 wherein the forward looking camera discards from detection images beyond the image patch.

* * * * *